July 9, 1929.  E. ABEL  1,720,111
ARRANGEMENT FOR RESETTING DERAILED RAILWAY VEHICLES ON THE RAILS
Filed Aug. 20, 1927   3 Sheets-Sheet 1
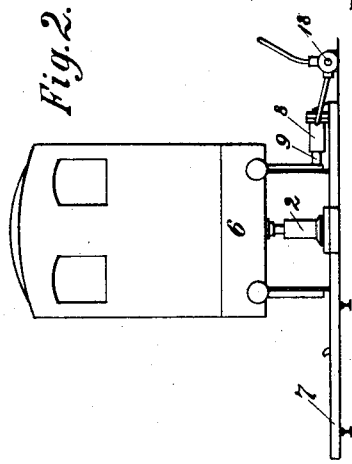
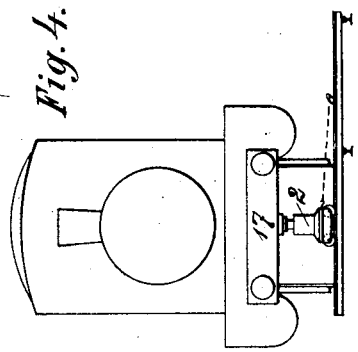
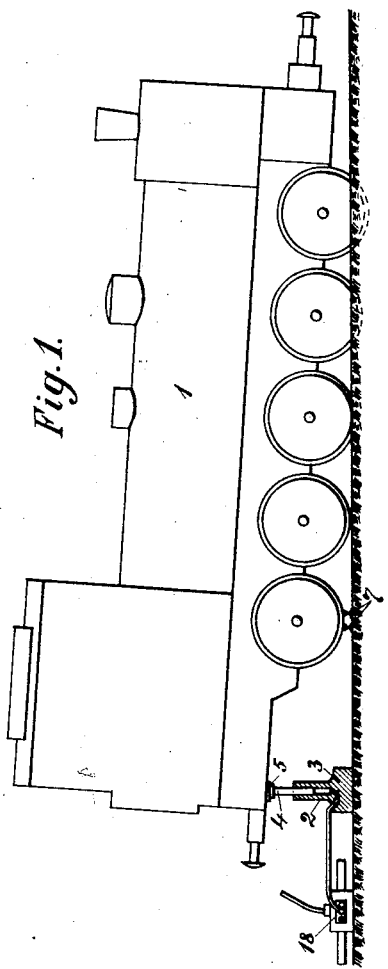
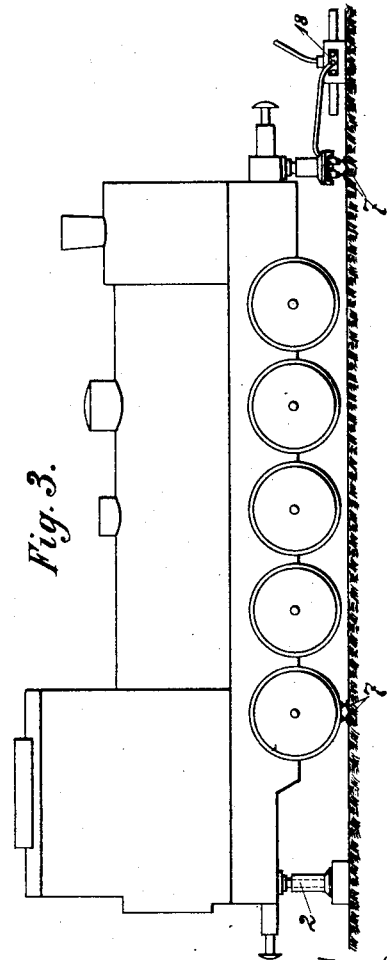
Inventor
Emil Abel
By Emil Bönnelycke
Attorney

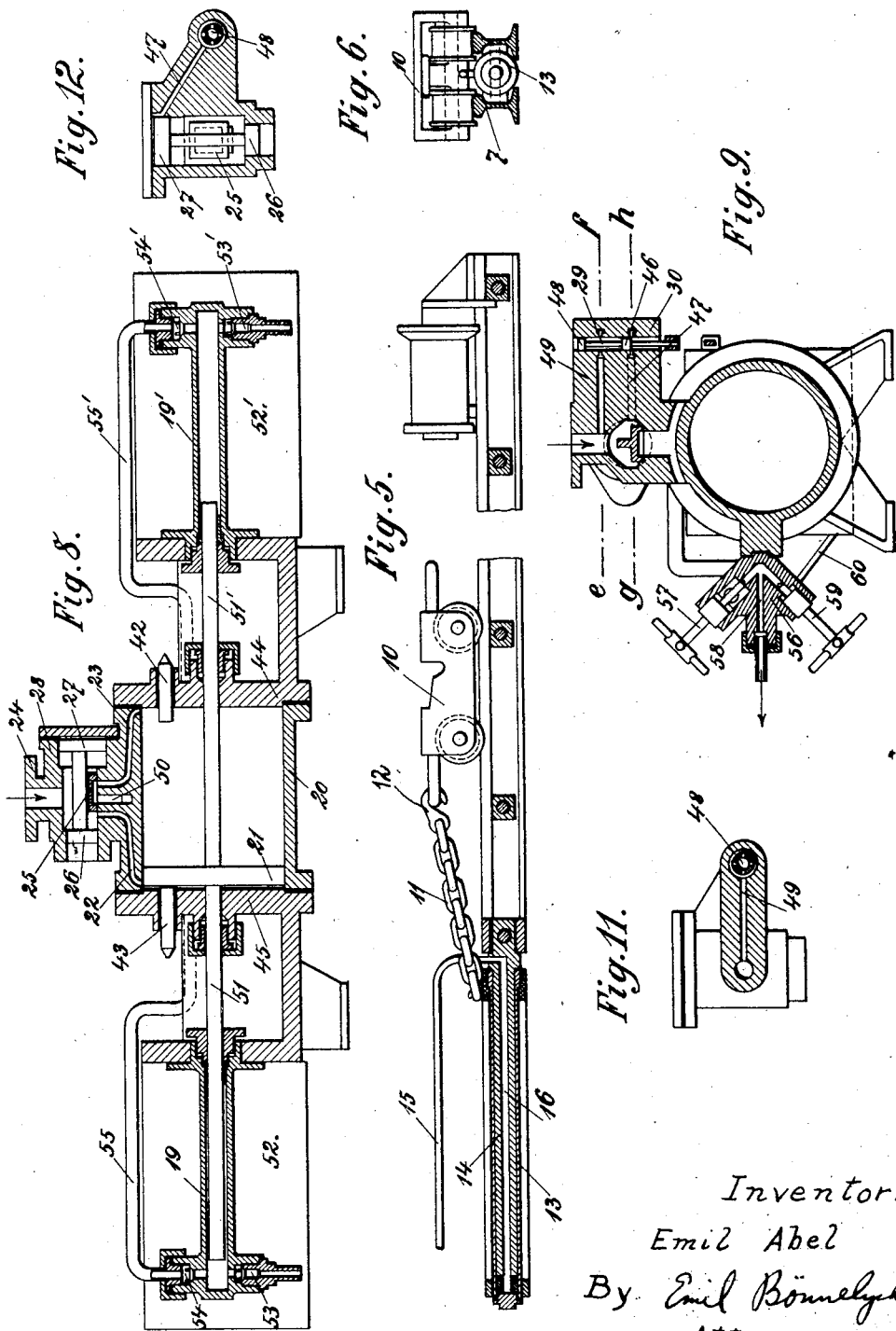

July 9, 1929.   E. ABEL   1,720,111
ARRANGEMENT FOR RESETTING DERAILED RAILWAY VEHICLES ON THE RAILS
Filed Aug. 20, 1927   3 Sheets-Sheet 3
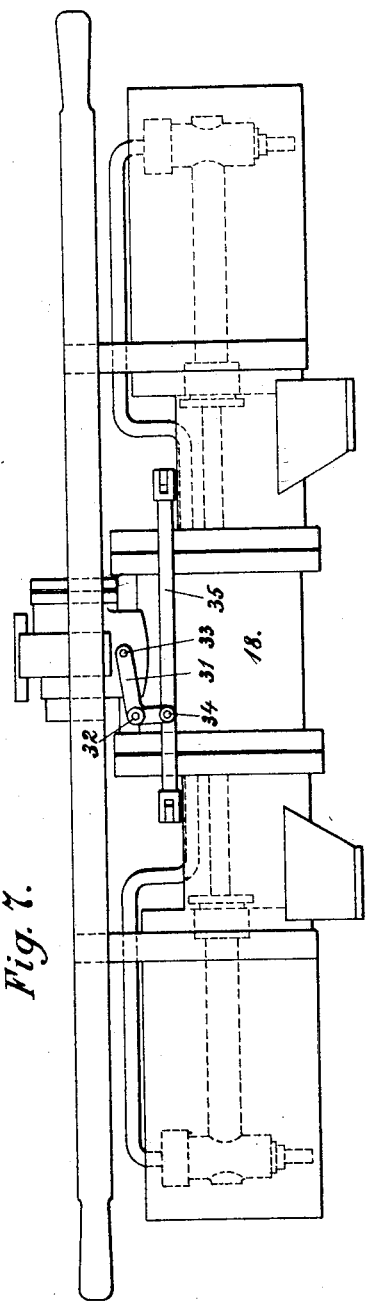
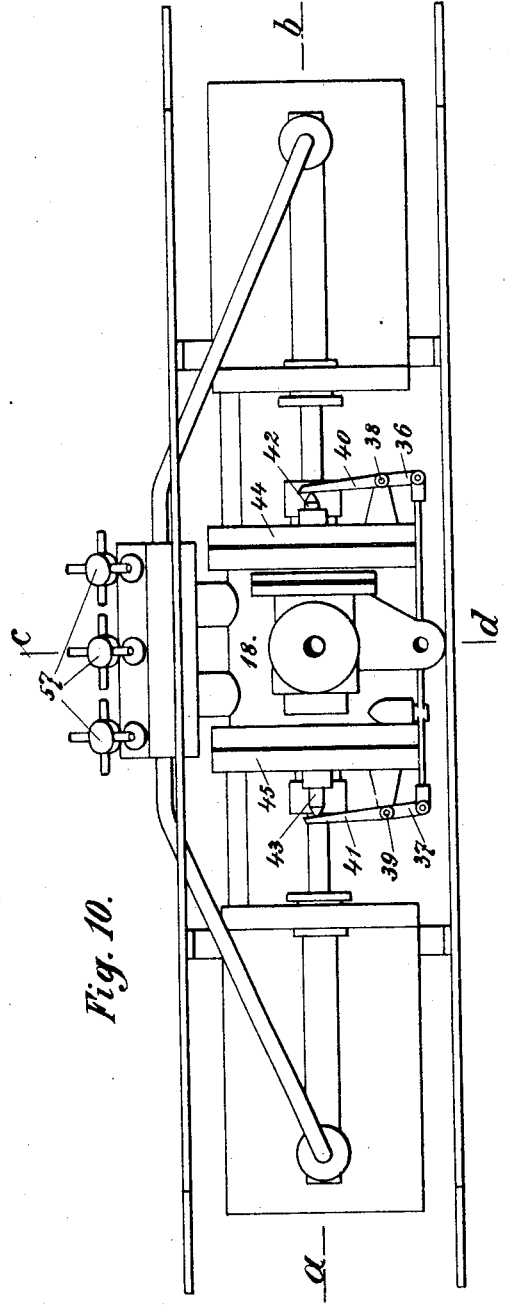
Inventor:
Emil Abel
By Emil Bönnelycke
Attorney Patented July 9, 1929.

1,720,111

UNITED STATES PATENT OFFICE.

EMIL ABEL, OF DORTMUND, GERMANY.

ARRANGEMENT FOR RESETTING DERAILED RAILWAY VEHICLES ON THE RAILS.

Application filed August 20, 1927, Serial No. 214,352, and in Germany June 21, 1927.

My invention relates to improvements in devices by means of which the righting of derailed locomotives, tenders, railway carriages, and so on, is facilitated, and further is much accelerated.

The means employed for the lifting of the vehicle, and for the lateral displacement of the lifted vehicles, may either comprise the power sources of the derailed engine, or the power available from an auxiliary or breakdown train.

In the first instance, compressed air from the airbrake apparatus may be used for the purpose of operating the lifting and shifting tackle or gear, but the invention is not limited to the use of compressed air only, as any other suitable operating medium may be employed.

As the power available at the time is, as a rule, not sufficient for the direct operation of the lifting or transporting devices, a power transformer according to the invention is placed into use, and by means of which the power taken from the source, e. g. the derailed engine, is transformed into sufficient power to speedily lift and shift the vehicle.

The accompanying drawing illustrates the devices according to the invention and their application in the case of a derailed locomotive, as well as all their particular parts, and for the purpose of illustrating the operation of the improved device, the use of compressed air is assumed, which compressed air is now available on nearly all railway trains, in conjunction with the brake apparatus. As a motive power the air compressor of the locomotive of the break-down train, or of the derailed train, or also the contents of the air reservoirs of the latter may be used.

As the air pressure available say from 5 to 8 atmospheres is not sufficient to operate the usual lifting and shifting gear directly, it is used in the power transformer for the purpose of producing by means of pumps, that are driven by the transformer above mentioned, a considerably higher pressure which in turn operates the lifting and shifting tackle. The pressure produced thus may be either hydraulic or pneumatic.

In said drawings:—

Figures 1 and 3 are side views of a locomotive and Figs. 2 and 4 end views illustrating the process of lifting and shifting a derailed locomotive, Fig. 5 illustrates a pressure cylinder, and a wagon drawn thereby and shifted laterally on a bridge, Fig. 6 is a side elevation of the device according to Fig. 5, Fig. 7 is a side view of the power transformer, Fig. 8 is a vertical section on line $a$—$b$ of Fig. 10, Fig. 9 is a cross-section on line $c$—$d$ of Fig. 10, Fig. 10 is a top view of the power transformer, Fig. 11 is a cross-section on line $e$—$f$ of Fig. 9, and Fig. 12 is a section on line $g$—$h$ of Fig. 9.

In Fig. 1, 1 represents a derailed locomotive. The rear end of the engine is already lifted, while the front end is still resting on the rails. For raising it, a hydraulic lifting jack 2 is employed, consisting of a vertical cylinder 3, and a plunger 4, working therein, the head 5 of which when the plunger is moved upwards by the admission of water under pressure into the cylinder 3, engages the transverse girder of the engine and thus lifts it.

When the engine is sufficiently raised, a bridge 7 consisting of a pair of rail lengths that are rigidly connected together, can be pushed under the lifted rear wheels of the engine. Thereafter the engine is lowered by relieving the hydraulic pressure water from the cylinder 3, till the rear wheels of the locomotive rest on the above-mentioned bridge. The front end of the engine is now raised in the same way, and the front wheels of the engine are now also deposited on another and similar bridge 7 at right angles to the rails the train is intended to run on.

Thereafter the engine is laterally shifted by means of the use of hydraulic pressure, developed in a horizontal pressure cylinder 8 with a plunger 9 engaging one of the wheels. The wheels may either rest immediately on the cross-wise rail of the bridge as represented in Fig. 2, or each of the wheels may be placed on a small truck 10, one of which is shown in Figs. 5 and 6, the carrying frame of which is preferably cut away to suit the profile of the locomotive wheels.

The lateral movement may also be effected in such a way that each of the wheels is placed on a small truck 10, one of which is drawn by means of a chain 11 and a hook or shackle 12, by means of a pressure cylinder 13 which is guided and movably fixed on the stationary plunger 14 as shown in Fig. 5. The medium producing the pressure is supplied to the cylinder 13 by means of a pipe 15 through an axial aperture 16 in the plunger 14.

The pressure device as shown in Fig. 5 also may be employed in connection with a lifting jack 2 which is mounted on rollers or a small carriage as shown in Fig. 4. The lifting jack 2 is adapted for gripping on the center of the front girder 17 on the frame of the locomotive.

The production of the necessary high pressure in a pressure medium for the operation of the lifting and shifting devices as above described is effected in a portable high pressure transformer, to which the necessary motive power is supplied in the form of compressed air from the compressed air container or reservoirs of the derailed vehicle, or from the compressor of the braking device on the engine.

The pressure transformer consists of the middle air pressure motor 18 acting as prime mover, and of two lateral compressors 19 and 19' driven by the above-mentioned motor.

A piston 21 is arranged in the cylinder 20 to which piston a reciprocating movement is imparted by means of the compressed air entering alternately through the channels or ports 22 and 23. The compressed air supplied through the pipe 24 at a pressure of approximately from 5 to 8 atmospheres, is alternately distributed to the two channels 22 and 23 by means of a slide valve 25 which is moved to and fro by controlling pistons 26 and 27 within a controlled cylinder 28. The motion of the controlled pistons 26 and 27 and of the therewith connected valve 25 is controlled in turn by an auxiliary slide valve 29 which is carried in a vertical bore of an auxiliary cylinder 30 which is cast of one piece with a control cylinder 28 or is rigidly screwed fast to it. The operation of the auxiliary slide valve is effected by means of a bell crank lever 31 pivoted at 32, and the arm 33 of which is by means of links connected to the extremity of the auxiliary valve rod 29. The other arm 34 is connected with a rod 35 which serves the purpose of imparting an oscillating motion to the bell crank lever 31, the rod 35 being moved forwards and backwards.

The movement of the rod 35 is effected by means of two levers 36 and 37 connected thereto by links, the levers being pivoted respectively at 38 and 39, and their arms 40 and 41 touch on the pins or projections 42 and 43, which are arranged to slide in slots in the covers of the cylinders 44 and 45.

The compressed air engine works as follows, viz:

When, at the time when the piston 28 and the slide valve 25 are in the position shown in Fig. 8 the compressed air enters into the cylinder 20 by means of the pipe connection 24 and the channel or duct 22, then the piston 21 is forced to the right. At the end of its travel it strikes against the internal end of the pin 42 and thus presses it outward. Thereby the lever 36 is turned, which, in its turn, pushes the rod 35 to the left. If the rod 35 is pushed to the left, then the bell crank lever 31 is rotated clockwise, and the auxiliary slide valve 29 is drawn downward, the control piston 46 of the auxiliary slide valve (Fig. 9) opens a channel or duct 47, without, however, the piston 48 closing the channel or duct 49, so that the compressed air gains admission to the back of the piston 27, coming from the inlet opening 24 through the channel 49, control cylinder 30 and channel 47, and forces the piston into the position shown in Fig. 12. By this the slide 25 (Fig. 8) is forced to the left, so that it opens the air channel 23 and connects the air channel 22 with the air exhaust 50. While the compressed air forces the piston 21 to the left, the air on the left side of the piston of the cylinder escapes through channel 50.

The piston rods 51 and 51' of the piston 21 serve at the same time as plungers for the hydraulic pressure pumps 19 and 19', which suck the water from the water containers 52 and 52' through the suction valves 53 and 53', and force the same through the pressure pipes 55 and 55' into the distributor 56 (Fig. 9), which is provided with three manually operated valves 57 for the purpose of being able to supply the water under pressure by means of one or more of the pressure pipes 58 to one or more of the lifting and shifting devices as above described. If the valves 59 are open, the water is free to flow back by means of the pipe 60 into the water reservoirs 52 and 52'.

The improved lifting device for derailed vehicles posessesses the advantage, that by the help of the power transformer the relatively low pressures, which are to be met with in the compressed air installation of a vehicle or engine, are transformed into very high pressures, for the purpose of quickly lifting the locomotive or cars of the derailed train again on the rails.

I claim as my invention:

1. In a device for righting derailed railway carriages the combination of a lifting and shifting gear, a transformer adapted to be fed by compressed air and for producing, by means of pumps driven by said transformer, a considerably higher pressure for the purpose of operating said lifting and shifting gear.

2. A device for righting derailed railway carriages comprising a lifting jack for the derailed vehicle, a bridge consisting of a pair of rails and adapted to be laid across the railway for the purpose of shifting the derailed vehicle thereon when lowered by said lifting jack on the bridge, and a shifting cylinder of small diameter arranged between the two rails of the bridge and adapted to move the vehicle on the bridge, and a transformer adapted to be fed by compressed air and for producing a high pressure for operating said lifting and shifting gear.

3. A device for righting derailed railway carriages comprising a bridge consisting of a pair of rails and adapted to be laid across the railway, a small carriage adapted to be shifted on said bridge by means of a small shifting cylinder and a piston therein being arranged between the rails forming said bridge, and a frame on said carriage, said frame being cut away to conform with the profile of the railway carriage wheels, and a transformer adapted to be fed by compressed air and to produce a high pressure for operating said shifting gear.

In testimony whereof I affix my signature.

EMIL ABEL.